July 1, 1930.  R. E. JENKINSON  1,769,694
VEHICLE TIRE
Filed Nov. 10, 1928
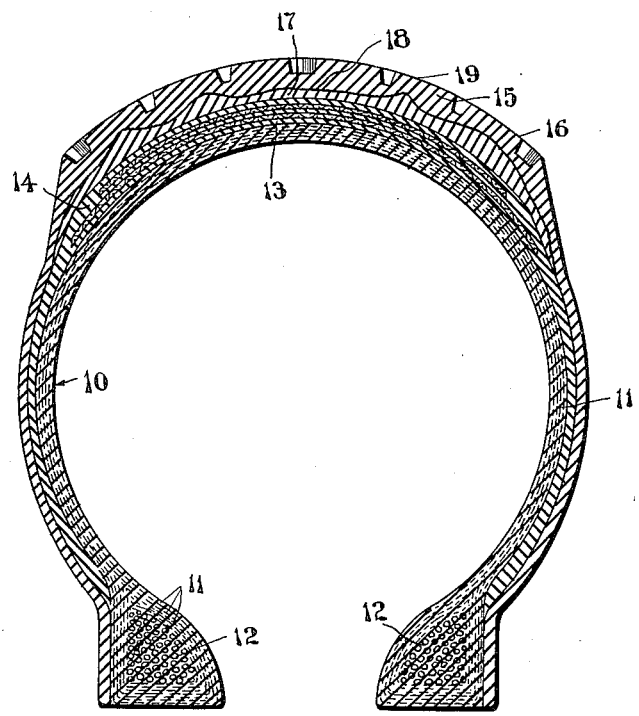
Inventor
Ross E. Jenkinson
By
Attorney Patented July 1, 1930

1,769,694

UNITED STATES PATENT OFFICE

ROSS E. JENKINSON, OF AKRON, OHIO, ASSIGNOR TO THE GOODYEAR TIRE & RUBBER COMPANY, OF AKRON, OHIO, A CORPORATION OF OHIO

VEHICLE TIRE

Application filed November 10, 1928. Serial No. 818,428.

This invention relates to vehicle tires and it has particular relation to a novel tread element that may be advantageously employed for vehicle tires.

The primary object of this invention is to provide a tread element for tires which is composed of a plurality of layers, the inner one of which is composed of a rubber compound capable of readily transmitting heat generated in the carcass therefrom.

A further object of the invention is to provide a tread of the above designated character wherein the inner layer is comparatively soft and resilient, in order to minimize the internal heat generated by pounding of the tread buttons upon the carcass.

Another object of the invention is to provide a tire embodying a tread element composed of a plurality of layers of rubber compound which decrease progressively in resiliency, softness and the ability to transmit heat from the innermost layer to the outermost layer.

As heretofore constructed, pneumatic tires have comprised a carcass consisting of a plurality of inner plies of cord fabric, a breaker strip disposed upon the cord fabric plies and imbedded in a relatively thin layer of soft cushion rubber, and an outer tread element of relatively hard, stiff, abrasion-resistant compound. In the tires of conventional design, the cushion about the breaker strip was composed of stock containing approximately 20 parts by weight of zinc oxide and 100 parts by weight of rubber. This material was extremely soft and elastic, thereby permitting some degree of movement of the tread element without unduly straining the fabric carcass. Unfortunately this soft compound offered but little resistance to abrasion, after the tread ply had worn away, and because of its low pigment content, it was a poor conductor of heat. Therefore, it was desirable to make it as thin as practicable. In actual practice the thickness of cushion rubber between the breaker strip and the tread element did not constitute much more than a tenth part of the entire thickness of tread. This thin layer was not sufficient adequately to cushion and to distribute the thrust of the tread buttons over the surface of the fabric.

The outer ply of rubber known as the tread element was usually prepared from stock containing approximately forty to fifty parts by weight of gas black and one hundred parts of rubber. This material offered high resistance to abrasion, but it was relatively stiff and inelastic. Therefore, its cushioning action was relatively slight. Furthermore, due to its stiffness and lack of resiliency and thickness, upon repeated flexure much heat was generated therein. Since the compound was also a poor conductor, the heat generated tended to escape inwardly through the thin layer of cushion rubber and fabric. As considerable heat was likewise generated in the latter, the temperature of the tire became excessive, sometimes reaching values of 300° F. in the region of the outer plies of fabric, thus resulting in carcass failures, such as blowouts. In tires designed for operation at high speed, it was necessary to reduce the thickness of the tread ply, thus sacrificing some of the abrasion resisting qualities in order to obtain adequate heat radiation to prevent blowouts. This was particularly true of large sizes of tires, such as those used on trucks and busses.

This invention consists in the discovery that by forming the tread elements of pneumatic tires of a resilient inner ply of stock highly loaded with zinc oxide and an outer ply composed of stock highly loaded with carbon black, much less heat is generated in and about the fabric, and the heat that is generated is conducted outwardly more rapidly than in tires of ordinary construction. Also, the impacts of the road upon the tread buttons are more uniformly distributed upon the fabric. At the same time, the resistance to abrasion, characteristic of the old style of tire treads is in a great measure retained.

For a better understanding of the invention, reference may now be had to the accompanying drawing forming a part of the disclosure, wherein is shown a view of a portion of a tire, transversely severed to illustrate in cross-section the several elements of the tire, embodying the features of the invention.

In the embodiment of the invention illustrated in the accompanying drawing, a tire carcass 10 is composed of superimposed fabric or cord plies 11, beads 12, and a conventional breaker strip 13. The latter is embedded in a cushion of relatively soft rubber 14, and has mounted thereon a tread element 15, composed of an outer layer 16 and an inner layer 17. The layers 16 and 17 are preferably extruded and have irregular contiguous surfaces, as indicated at 18, along which they are united prior to the mounting of the tread upon the carcass.

It is necessary that the outer portion of the tread 15 be of relatively hard rubber in order properly to withstand the wearing effect of its engagement with the road. The layer 16 is preferably, but not necessarily, composed of the usual carbon black compound.

The inner layer 17, which is vulcanized to the carcass 10, however, must be composed of a compound having several characteristics necessary to the proper functioning of the tire in accordance with this invention. It must be relatively soft and resilient, in order to cushion the inward movement of the layer 16 and particularly of the tread buttons 19, to prevent what is known as tread or button pounding common in tires utilized prior to this invention.

The pounding of the tread; that is, the action of the tread upon the carcass, causes the generation of considerable heat which is the direct cause, in some instances, of tire failure by blowout. It is apparent that the provision of this relatively soft and resilient area between the hard tread 16 and the carcass 10 will do much to obviate this difficulty. Also, the layer 17 must be capable of quickly transmitting heat generated in the carcass away therefrom, in order to prevent failure of the plies due to excessive heat.

Any compound which has the general characteristics set forth above may be utilized and satisfactory results have been obtained by the use of a rubber compound commonly known to the trade as "zinc stock"; that is, a stock which includes as one of its elements a large quantity of zinc oxide which renders the compound highly resilient and also a good conductor of heat.

The relative proportions of the various ingredients in the rubber compounds employed may vary within relatively wide limits. For example, the stock employed for the outer ply 16 of the tread may contain from thirty-five to fifty parts by weight of carbon black for each one hundred parts of rubber. The following is a typical compound which has been found to be quite satisfactory for the purpose:

| | Parts by weight |
|---|---|
| Rubber | 100 |
| Zinc oxide | 5 |
| Sulfur | 3 |
| Pine tar or other softener | 5 |
| Accelerator (mercaptobenzothiazole) | 1 |
| Carbon black | 43 |

The inner ply 17 preferably should contain from one hundred twenty-five to one hundred fifty parts by weight of zinc oxide for each one hundred parts of rubber. The following is a satisfactory formula for this material:

| | Parts by weight |
|---|---|
| Rubber | 100 |
| Zinc oxide | 143 |
| Sulfur | 3.6 |
| Tar or other softener | 6.25 |
| Accelerator | .78 |
| Carbon black | 5.46 |

The relative proportions of the inner and outer plies may vary somewhat, but for best results the inner ply should constitute from a fourth to a third of the whole tread. If approximately these proportions are employed, the cushioning effect of the tread upon the carcass is greatly increased, thereby reducing both flexure and the amount of heat generated in the latter. Furthermore, since the layer 17 has higher resiliency than ordinary tread stock, less hysteresis loss occurs therein, and consequently there is less generation of heat in the region adjacent the fabric. Finally, the zinc stock has a higher coefficient of heat conductivity than common tread stock. Therefore, the heat generated in the fabric plies is radiated more rapidly than in tires of ordinary design.

Any standard cushion stock may be employed for the cushion ply 14, but preferably a compound containing from fifteen to thirty parts by weight of zinc oxide for each one hundred parts of rubber should be selected. This stock should not contain over five percent of carbon black.

The layer 17 is preferably utilized only adjacent the outer portion of the tire while the layer 16 engages the side-walls of the body 10 in the usual manner.

From the foregoing description it will be apparent that this invention is applicable to some forms of cushion tires as well as to casings for pneumatic tires, as shown.

Although I have illustrated only one form which the invention may assume and have described in detail only a single application thereof, it will be apparent to those skilled in the art that it is not so limited, but that various minor modifications may be made therein without departing from the spirit of the invention or from the scope of the appended claims.

What I claim is:

1. A tread element for vehicle tires comprising an outer ply of stock containing approximately 43 parts by weight of carbon black for 100 parts of rubber, and an inner ply containing approximately 140 parts by weight of zinc oxide for each 100 parts of rubber.

2. A tread element for vehicle tires comprising an outer ply of stock containing between 35 and 50 parts by weight of carbon black for 100 parts of rubber, and an inner ply containing between 125 and 150 parts by weight of zinc oxide for each 100 parts of rubber, each of said plies having irregular contiguous surfaces.

3. A pneumatic tire comprising a fabric carcass and a tread element secured thereto, comprising an inner ply of stock composed of approximately 140 parts by weight of zinc oxide for each 100 parts of rubber, and an outer ply composed of stock containing approximately 43 parts of carbon black for each 100 parts of rubber.

4. A pneumatic tire comprising a fabric carcass and a tread element secured thereto, comprising an inner ply composed of stock containing between 125 and 150 parts by weight of zinc oxide for each 100 parts of rubber, and an outer ply composed of stock containing between 35 and 50 parts by weight of carbon black for each 100 parts of rubber.

In witness whereof, I have hereunto signed my name.

Signed at Akron, in the county of Summit and State of Ohio, U. S. A., this 9th day of November, 1928.

ROSS E. JENKINSON.